Patented Nov. 17, 1925.

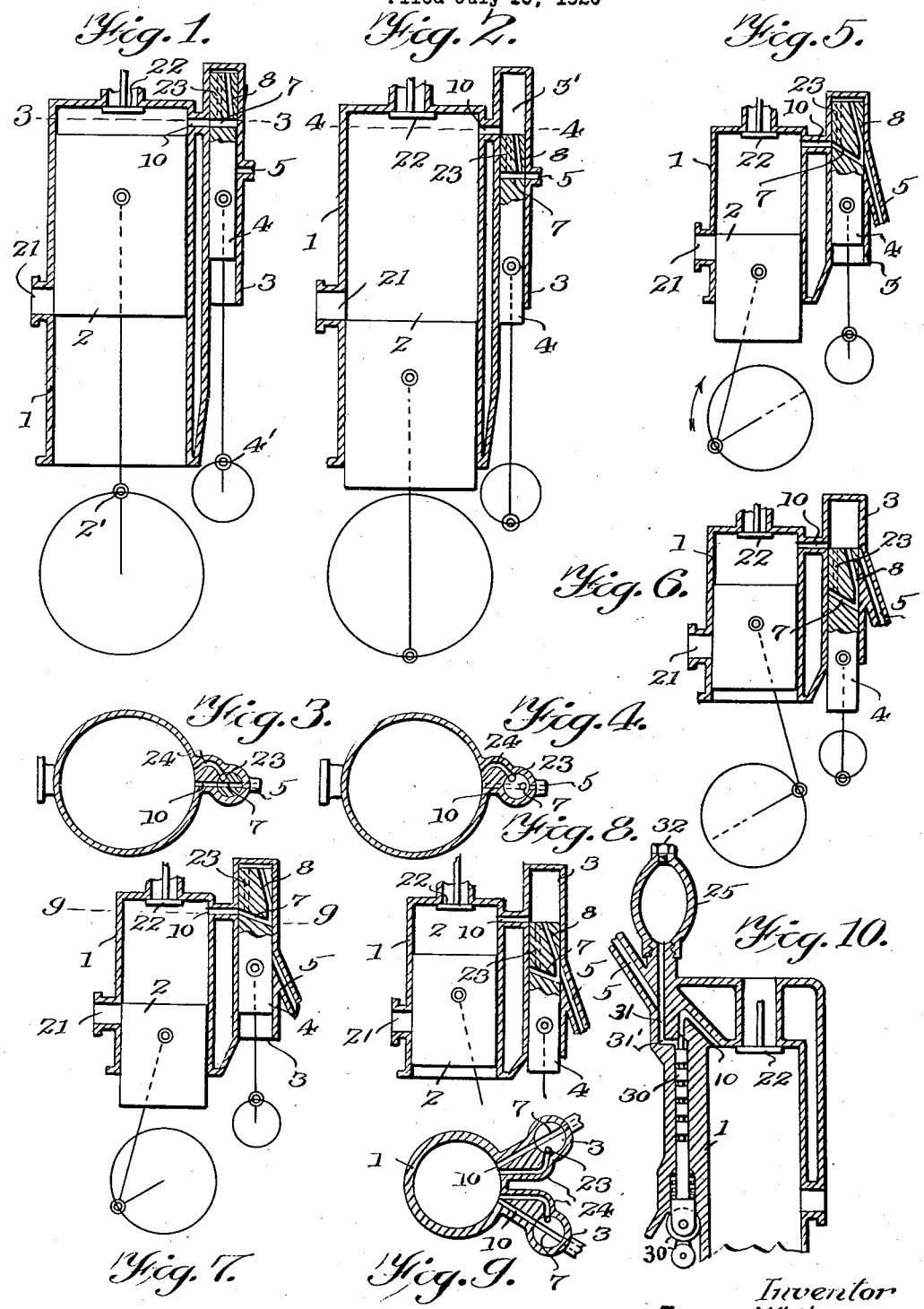

1,562,106

UNITED STATES PATENT OFFICE.

FRANZ MÄDLER, OF CHARLOTTENBURG, GERMANY, ASSIGNOR TO MAEDLER ENGINE CORPORATION, A CORPORATION OF MARYLAND.

WORKING PROCESS FOR INTERNAL-COMBUSTION ENGINES.

Application filed July 16, 1920. Serial No. 396,870.

(GRANTED UNDER THE PROVISIONS OF THE ACT OF MARCH 3, 1921, 41 STAT. L., 1313.)

*To all whom it may concern:*

Be it known that I, FRANZ MÄDLER, a citizen of the German Empire, residing at Charlottenburg, Germany, have invented certain new and useful Improvements in Working Processes for Internal-Combustion Engines (for which I have filed applications as follows: Germany, Sept. 26, 1918; Germany, June 10, 1919; Germany, May 20, 1919; Germany, Oct. 24, 1919; Germany, Oct. 24, 1919; Germany, Apr. 17, 1920; Germany, Apr. 17, 1920; Germany, Jan. 31, 1921; Germany, Jan. 31, 1921; England, June 15, 1920; England, June 18, 1920; England, July 5, 1920; England, June 18, 1920; Austria, June 8, 1920; Hungary, July 9, 1920; Czechoslovakia, June 21, 1920; Poland, June 28, 1920; Canada, July 10, 1920; Australia, Aug. 23, 1920; Switzerland, June 12, 1920; France, July 10, 1920; Belgium, July 2, 1920; Italy, June 30, 1920; Spain, July 8, 1920; Portugal, July 10, 1920; Holland, July 5, 1920; Finland, June 30, 1920; Denmark, June 19, 1920; Sweden, June 25, 1920; Norway, June 30, 1920), of which the following is a specification.

My invention is for means and methods for operating internal combustion engines, and is particularly applicable to two-stroke engines, although not limited thereto. The underlying principle of my invention resides in the utilization of a small proportion of combustion gases in the main cylinder to prepare a charge of fuel in an auxiliary chamber for combustion and at the right moment inject the same into an air charge in the main cylinder to form the combustible mixture. The high temperature and pressure of the combustion gases so act upon the fuel as to vaporize the same and thus prepare it for efficient mixing and combustion with the air charge in the main cylinder.

The basic idea of my invention may be carried out in several ways and by means of any practical apparatus. The fuel is subjected to the action of hot and high-pressure combustion gases in a suitable chamber of proper construction and design, which may be in the form of an auxiliary cylinder with a piston, or which may be simply a small enclosed space suitable for the purpose and adapted to be placed into and out of communication with the main cylinder.

One of the great advantages of my novel method of preparing fuel is the fact that the fuel is treated by the action of hot and practically inert combustion gases, and hence there is no danger of the fuel becoming charred or burnt in these gases, as would be the case if the gaseous meduim used contained oxygen, or would otherwise chemically combine with the fuel.

According to one form of my new method, the fuel charge and hot combustion gases are compressed in an auxiliary chamber to a point above self-ignition of the fuel, and this highly compressed mixture of fuel and gases is injected into a less highly compressed air charge in the main cylinder, so that self-ignition of the combustible mixture formed by the fuel charge with the air charge takes place. This method may be varied by injecting the fuel charge and combustion gases into the air charge in the main cylinder when this air charge is not compressed highly enough to cause self-ignition. In this instance there is no self-ignition, and separate ignition of the combustible mixture is necessary, as by means of an electric spark or otherwise.

Another modification of my invention consists in causing combustion gases in the main cylinder to carry a previously deposited fuel charge into a closed chamber, where the high temperature and pressure of the gases instantly vaporize the volatile portions of the fuel and at the proper time inject the vaporized fuel into the air charge in the main cylinder. Non-volatile matter in the fuel remains behind in the chamber. This method is particularly applicable in the case of heavy fuel, which always contains non-volatile residues. In the preferred form of my invention, the vaporized fuel charge and combustion gases are injected into the main cylinder in streams or paths which intersect each other in the main cylinder, thereby effecting intimate mixing of the fuel and air charge for self-ignition or separate ignition.

In the drawings affixed to this specification and forming part thereof, diagrammatic views of different types of engines for carrying out my new methods are illustrated by way of example. For the sake of clearness and simplicity, I have shown only such engine parts as are necessary to an understanding of my invention. In these drawings—

Fig. 1 represents a longitudinal cross-section of an engine for causing combustion gases from the main cylinder to act upon a fuel charge in a small auxiliary cylinder for self-ignition of the fuel in the main cylinder, the two pistons being shown in their innermost position at approximately the moment of ignition.

Fig. 2 is a view similar to Fig. 1, the pistons being shown in their outermost position and the two cylinders being in communication with each other at approximately atmospheric pressure;

Fig. 3 is a transverse cross-section on line 3—3 of Fig. 1;

Fig. 4 is a transverse cross-section on line 4—4 of Fig. 2;

Fig. 5 shows a longitudinal cross-section of an engine adapted to carry out my new method of operation in such form as to require separate ignition of the fuel, this view showing the auxiliary piston in its highest position when fuel is injected into the main cylinder, which has been scavenged and is now filled with an air charge at a pressure below that required for self-ignition;

Fig. 6 is a view similar to Fig. 5, showing the auxiliary piston in its lowest position, when the auxiliary cylinder is filled with combustion gases from the main cylinder;

Figs. 7 and 8 are views similar to Figs. 5 and 6, respectively, with this modification, that in Figs. 7 and 8 the fuel inlet is so located that a fuel charge is deposited in the auxiliary cylinder when the auxiliary piston is in its lowest position as shown in Fig. 8, whereas in Figs. 5 and 6 the fuel is deposited in the auxiliary cylinder when the auxiliary piston has moved down from its highest position sufficiently to cut off communication with the main cylinder;

Fig. 9 is a transverse cross-section on line 9—9 of Fig. 7, showing the duplicate arrangement of auxiliary cylinders for each working cylinder; and Fig. 10 is a longitudinal cross-section of an engine for carrying out another modification of my invention, especially suitable for the use of heavy fuel.

I can best describe my invention in detail by explaining how my new methods may be carried out in practice by means of the apparatus illustrated by way of example in the drawings. I will first refer to Figs. 1–4, which diagrammatically show a two-stroke engine adapted to utilize the principle of my invention for causing self-ignition of the fuel.

A main cylinder 1 is provided with a working piston 2 which is connected to the crank-shaft of the engine in the usual way, as diagrammatically indicated at 2′. A small auxiliary cylinder 3 is attached to or otherwise operatively connected with the main cylinder. A piston 4 is arranged to reciprocate in the auxiliary cylinder and is driven from the cam-shaft by any suitable connections, as diagrammatically indicated at 4′. Fuel is admitted into the auxiliary cylinder through a port 5, which is adapted to be connected with a source of fuel supply.

The auxiliary piston 4 is provided with a transverse bore or channel 7 and an axial channel 8 extending from channel 7 through the top of the auxiliary piston. The axial channel 8 is shown slightly oblique, this being merely for the mechanical convenience of boring the channel. Communication between the two cylinders is established through a channel 10. When the auxiliary piston is in its lowest position, as shown in Fig. 2, the channel 10 is uncovered, and at the same time the radial bore 7 communicates with the fuel inlet 5. The auxiliary piston 4 is also provided with an oblique channel 23 arranged to communicate with a passage 24 which connects the two cylinders. As seen in Figs. 3 and 4, the passages 10 and 24 are arranged at an intersecting angle to each other for a purpose that will presently appear.

The main cylinder is filled with fresh air through a suitable valve 22, and the exhaust gases pass out through exhaust port or ports 21, connected with an exhaust pipe (not shown). It will be understood that the movements of air admission valve 22 are properly timed by suitable connections, as from the cam shaft, which I need not describe.

The main piston 2 and the auxiliary piston 4 move in and out of their respective cylinders together, although they may not always be in the same relative position on account of the timing of the auxiliary piston. Let us assume the pistons to be in the position shown in Fig. 1. The ignition is taking place and both pistons start to move down. At the time of the combustion, the pressures in the two cylinders are equal, because the channel 10 is open. This means that the auxiliary cylinder is filled with combustion gases under high pressure before communication with the main cylinder is cut off as the auxiliary piston descends. When the pistons are at their lowest position (see Fig. 2), the main piston has finished its power stroke, and the exhaust gases have been discharged from the main cylinder through exhaust ports 21. The air admission valve 22 has then been opened, and the main cylinder is scavenged and filled with a fresh air charge. As soon as the auxiliary piston 4 is at its lowest point, the auxiliary cylinder 3 is again in communication with the main cylinder through channel 10, and the residual burnt gases which are still under comparatively high pressure in the auxiliary cylinder discharge themselves into the main cylinder, which is at approximately atmospheric pressure. This leaves the auxiliary cylinder practically filled with inert combustion gases at approximately atmospheric pressure. Fuel is now admitted through inlet 5 and is stored up in the horizontal channel 7 and the oblique channel 8. There is also a possibility that a very small portion of the fuel may be sprayed into the chamber 3' of the auxiliary cylinder 3.

When the pistons now begin to move inward (or upward as shown in Fig. 1), communication through channels 10 and 24 is cut off, the air charge in the main cylinder is compressed, and the inert combustion gases in the auxiliary cylinder are compressed to a considerably higher degree than the air in the main cylinder. By this higher compression the gases in the auxiliary cylinder reach a temperature far above that required for the self-ignition of the fuel. However, as these highly compressed gases consist of inert combustion gases devoid of oxygen, there is no danger of self-ignition in the auxiliary cylinder. When the two pistons reach their innermost position (Fig. 1), communication between the two cylinders is reestablished through channels 10 and 24. The high pressure of the gases in the auxiliary cylinder forces the fuel out of channels 7 and 8 through channel 10 into the main cylinder. At the same time, some of the hot high-pressure gases pass through channels 23 and 24 into the main cylinder. The arrangement of the channels 10 and 24 (see Figs. 3 and 4) is such that the hot gases issuing out of channel 24 meet the sprayed fuel as it enters the main cylinder through channel 10 and cause self-ignition of the fuel and air mixture now combining in the main cylinder.

In a four-cycle engine, the method of my invention is carried out as follows:

The auxiliary piston 4 operates at one-half the speed of the working piston 10. During the power stroke in the main cylinder, the channel 10 is open, and the auxiliary cylinder is filled with combustion gases at the same high pressure as exists in the main cylinder. At the end of the power stroke of the main piston, the auxiliary piston is just half-way down its stroke, and the channel 10 is cut off.

At the end of the exhaust stroke of the working piston, the auxiliary piston reaches the bottom of its stroke and again uncovers passage 10. Any excess pressure in the auxiliary cylinder is released into the working cylinder and out through the exhaust passage. At this moment a measured quantity of fuel is admitted into the auxiliary cylinder in any practical way.

On the suction stroke of the main piston, the auxiliary piston cuts off the passage 10 and starts to compress the fuel charge and combustion gases in the auxiliary cylinder.

At the end of the compression stroke of the working piston, the auxiliary piston again uncovers passage 10, and the more highly compressed prepared fuel charge is injected into the compressed air charge in the working cylinder, whereupon self-ignition takes place.

The advantages of the process or method above described, will be apparent to those skilled in the art. By this method of operating an internal combustion engine, the compression in the main cylinder can be kept relatively low, irrespective of the character of the fuel and the speed of the engine. As a result, the unavoidable heat losses which always follow the use of very high compression are prevented, and likewise the working parts of the engine can be constructed much lighter. The fuel is admitted into the main cylinder against a far lower pressure than in prior self-ignition engines where the fuel must be injected under tremendous pressure into the working cylinder in which the air has been compressed to a very high degree to produce self-ignition of the fuel charge.

In the engine of the present invention, liquid fuel is introduced into the auxiliary cylinder against only approximately atmospheric pressure. In this small auxiliary cylinder, only a small proportion of the engine power is required to compress the small volume of gases contained therein to the point of self-ignition of the fuel. Furthermore, these incandescent gases and fuel charge can be injected into the air charge of the main cylinder at any predetermined time, whereby the highest possible efficiency of the engine can be obtained in respect to the load and speed at which it is being operated. In other words, the moment of injection of the fuel and incandescent gases into the air charge of the main cylinder can be controlled relatively to the position of the main piston, and self-ignition will always take place in the practical operation of the engine.

Another form of my new method comprises the injection of the prepared fuel by the highly compressed combustion gases into the air charge of the main cylinder while this air charge is compressed to a point below that necessary for self-ignition. This does not cause self-ignition of the fuel, but requires separate ignition, as by an electric spark or otherwise. This modified form of method may be carried out by a two-stroke engine like that represented in Figs. 5-9. Since the constructions shown in these figures are practically the same as that of Figs. 1-4, it will not be necessary to repeat a detailed description of Figs. 5-9. The same reference numerals are used in Figs. 1-4 and Figs. 5-9, to indicate corresponding parts. The process according to Figs. 5-9 is as follows:

The main piston 2 in Fig. 5 is returning from its bottom stroke, and has just covered the exhaust port or ports 21. The air admission valve 22 has been closed, and the main cylinder is now filled with a charge of fresh air, which is therefore at approximately atmospheric pressure. The auxiliary piston 4 is approximately at its innermost position and has connected the two cylinders. The highly compressed combustion gases in the auxiliary cylinder have injected the fuel into the air charge in the main cylinder. As previously stated, this air charge is then at approximately atmospheric pressure. After the fuel injection is completed, the connection with channel 10 is interrupted by the downward movement of the auxiliary piston 4. While the channels 7 and 8 are in connection with fuel inlet 5, the next fuel charge is admitted through passage 5 and deposited in channel 7 or at the junction of channels 7 and 8. Simultaneously with the downward movement of auxiliary piston 4, the main piston moves up and compresses the mixture of fuel and air. When the main piston is at the top of its stroke, this compressed mixture is in a combustible condition, and is ignited by any well known means, as by an electric spark. Connection between the two cylinders through channel 10 is again established when the auxiliary piston 4 is at the bottom of its stroke, as shown in Fig. 6. In this position of the auxiliary piston, the auxiliary cylinder is again filled with highly compressed combustion gases from the main cylinder. As the auxiliary piston, now carrying a fuel charge, moves upwardly, these gases are still further compressed until the auxiliary piston reaches its innermost position, whereupon the fuel is injected into the air charge in the main cylinder, as previously described.

In Figs. 7 and 8, the fuel inlet 5 is so arranged that it connects with channels 7 and 8 in the auxiliary piston 4 when the latter is approximately at its bottom stroke, as shown in Fig. 8.

I prefer that each working cylinder of the engine be provided with two auxiliary cylinders and their accessories. This arrangement is shown in Fig. 9. Either of these auxiliary cylinders is provided with a device for cutting it off from the working cylinder, and either of them is out of action at any particular time, so that it may be cleaned, repaired, etc., while the engine is running. That is to say, only one auxiliary cylinder is in operation at a time, the other auxiliary cylinder being in reserve.

The principle of my invention is particularly applicable in a process utilizing heavy fuels, which contain non-volatile matter. This form of my invention may be carried out in an apparatus like that indicated diagrammatically in Fig. 10. A small auxiliary chamber 25 connects with the main cylinder through channels 31 and 10, which in effect form a single passage. The chamber 25, which is quite small in proportion to the volume of the main cylinder, is arranged outside the cylinder in any practical way for the reception of inert (or substantially inert) combustion gases from the interior of the main cylinder when these gases have reached the desired temperature and pressure. The passage formed by channels 10 and 31 is controlled by a suitable valve 30, constructed and arranged to be properly operated and timed from the cam shaft by any practical connections, as by a cam 30'. It will be understood that cam 30' represents diagrammatically any suitable controlling means for the valve 30. In Fig. 10, as in the other figures, 5 indicates a fuel inlet and 22 represents a properly timed air admission valve.

Let us suppose that a metered amount of fuel has been pumped through fuel inlet 5 and deposited in the space 31' of channel 31 during the compression stroke of the main piston. The valve 30 is closed during the compression stroke, and is opened at a time when the combustion gases in the working cylinder have reached the desired pressure and temperature, so that a very small portion of these gases enters the chamber 25 through the connection channel 10, the valve seat and the channel 31. This portion of the gases rushing into the chamber 25 carries the deposited fuel in space 31' along. Owing to the pressure, temperature and velocity of the combustion gases as they rush into chamber 25, the fuel is immediately vaporized, and any solid particles contained in the fuel which are not volatile and so cannot be vaporized, are blown against the walls of chamber 25, where they adhere. The cylinder has been charged with fresh air at approximately atmospheric pressure and the air admission valve 22 and exhaust port 21 are closed. Then the valve 30 is again opened, so that the prepared gaseous fuel rushes out under its own high pressure into the air charge in the main cylinder. The temperature and pressure at which the combustion gases enter the auxiliary chamber 25 depend upon the timing of valve 30. This valve may be opened at a moment when the combustion gases in the working cylinder have reached approximately their highest temperature and pressure, or at any other desired moment.

This method, as pointed out, is particularly suitable for heavy oils containing large amounts of non-volatile residual matter, because any solid particles of the fuel which cannot be vaporized inpinge on the walls of the chamber 25, where they adhere and may later be removed. In this way, solid particles contained in the fuel are prevented from entering the working cylinder. These solid particles are at first tarry matter which sticks to the walls of the chamber, and then they harden into a black hard slag-like substance, which can be cleaned out with proper tools.

The fuel, instead of being stored in channel 31, may be injected directly into chamber 25. This injection is done through any suitable opening, such as 32, and by any suitable means. The chamber 26 is preferably not cooled, so as to help vaporize the fuel.

In starting an engine operating according to the method of my invention, a fuel easily gasified is injected into the small auxiliary chamber or cylinder while the latter is cut off from the main cylinder. Then, by means of an ordinary pump, the fuel is put under air pressure in the auxiliary chamber, and then this chamber is placed in communication with the main cylinder at the right time. Thereupon, the fuel is sprayed into the air charge of the cylinder in order to form the combustible mixture. After the ignition of this easily gasified fuel and air mixture has taken place, the hot high-pressure combustion gases take up the preparation of the normal fuel, as previously described.

Although the methods of my invention have been explained in connection with two-stroke internal combustion engines, these methods can, with proper alterations, be employed for four-cycle engines as well. Also, my new methods are suitable for engines driven by mixed fuel (liquid and gaseous fuel), and for engines driven by gaseous fuel only.

For the sake of simplicity, I have shown only a single cylinder in the various views in the drawings, but it is obvious that the method of my invention is applicable to the operation of internal combustion engines having a plurality of working cylinders.

It will be clear that the method of my invention is independent of any specific form or design of apparatus. The various constructions herein set forth, while new and novel and of my invention, are to be regarded as merely illustrative of suitable mechanisms by means of which the method of my invention may be carried out in practice.

I do not herein claim the apparatus herein shown and described, because the same forms the subject matter of my copending applications Serial Numbers 752,184 and 752,185, both filed November 25, 1924, as divisions or continuations of the present case.

I claim:

1. A method of preparing the combustion charges in internal combustion engines, which comprises filling a small auxiliary chamber with practically inert hot combustion gases directly from the working cylinder before the exhaust opens, filling the working cylinder with an air charge while the auxiliary chamber is cut off from the cylinder, subjecting a fuel charge to the action of the combustion gases in said auxiliary chamber and holding said mixture of fuel and gases in said chamber while this chamber is positively closed and while said gases are under high temperature and pressure conditions, whereby said fuel charge is treated in said closed chamber for a sufficient length of time, so that it is prepared for efficient mixing and combustion with the air charge in the working cylinder, and releasing said gaseous mixture at the proper moment to inject the highly compressed prepared fuel charge from the auxiliary chamber into the less highly compressed air charge in the working cylinder.

2. A method of preparing combustion charges in internal combustion engines, which comprises filling a small auxiliary chamber with practically inert hot combustion gases directly from the working cylinder before the exhaust opens, filling the working cylinder with an air charge while the auxiliary chamber is cut off from the cylinder, subjecting a fuel charge to the action of the combustion gases in said auxiliary chamber, compressing said mixture of fuel and combustion gases in said chamber while the same is positively closed, whereby said fuel charge is prepared in the closed chamber by the action of the gases under conditions of high temperature and pressure, so that the fuel is rendered suitable for efficient mixing and combustion in the working cylinder, and releasing said gaseous mixture at the proper moment to inject the highly compressed prepared fuel charge from the auxiliary chamber into the less highly compressed air charge in the working cylinder.

3. A method of preparing combustion charges in internal combustion engines, which comprises filling a small auxiliary chamber with inert hot combustion gases directly from the working cylinder at a moment when approximately the maximum temperature and pressure exist in the working cylinder, depositing predetermined fuel charge in such a position that it is vaporized without further compression in the auxiliary chamber by the high temperature and pressure of the combustion gases in said chamber while this chamber is positively cut off from the source of fuel supply and the working cylinder, holding the gaseous mixture in the closed chamber for a sufficient length of time to prepare the fuel for efficient combustion in the air charge in the working cylinder, and positively opening the auxiliary chamber at the proper moment to allow the pressure of the gaseous mixture in said chamber to inject the prepared fuel into the working cylinder.

4. A method of preparing combustion charges in internal combustion engines, which comprises filling a small auxiliary chamber with combustion gases from the working cylinder when the gases are at high temperature and pressure, filling the working cylinder with an air charge, subjecting a predetermined fuel charge to the action of said combustion gases in the closed auxiliary chamber for a sufficient length of time to vaporize the volatile percentage of the fuel for efficient combustion in the working cylinder and to cause any solid particles of the fuel to be retained in said auxiliary chamber without interfering with the proper functioning of the chamber, and positively opening the auxiliary chamber to the working cylinder at the proper moment to allow the gaseous mixture of volatile fuel and combustion gases to be discharged into the air charge of the working cylinder.

5. A method of preparing and injecting fuel into the working cylinder of an internal combustion engine, which comprises depositing a fuel charge in a predetermined position, filling a small auxiliary chamber with combustion gases from the working cylinder at a moment when approximately the maximum temperature and pressure exist in the working cylinder, said fuel charge being so deposited that it is carried by said combustion gases into the auxiliary chamber, whereby said fuel charge is vaporized and held in said chamber under high temperature and pressure while said chamber is cut off from the working cylinder, filling the working cylinder with an air charge at approximately atmospheric pressure, and releasing said high-pressure combustion gases to inject the vaporized fuel into the less highly compressed air charge in the working cylinder, solid particles of the fuel adhering to the walls of the auxiliary chamber.

In testimony whereof I affix my signature.

FRANZ MÄDLER.